(12) United States Patent
Brookhyser et al.

(10) Patent No.: US 11,281,069 B2
(45) Date of Patent: Mar. 22, 2022

(54) OPTICALLY CONTACTED ACOUSTO-OPTIC DEVICE AND METHOD OF MAKING THE SAME

(71) Applicant: ELECTRO SCIENTIFIC INDUSTRIES, INC., Portland, OR (US)

(72) Inventors: James Brookhyser, Portland, OR (US); Kurt Eaton, Portland, OR (US)

(73) Assignee: Electro Scientific Industries, Inc., Beaverton, OR (US)

(*) Notice: Subject to any disclaimer, the term of this patent is extended or adjusted under 35 U.S.C. 154(b) by 87 days.

(21) Appl. No.: 16/619,875

(22) PCT Filed: Jun. 19, 2018

(86) PCT No.: PCT/US2018/038195
§ 371 (c)(1),
(2) Date: Dec. 5, 2019

(87) PCT Pub. No.: WO2019/009999
PCT Pub. Date: Jan. 10, 2019

(65) Prior Publication Data
US 2020/0209707 A1    Jul. 2, 2020

Related U.S. Application Data

(60) Provisional application No. 62/528,278, filed on Jul. 3, 2017.

(51) Int. Cl.
*G02F 1/33* (2006.01)
*G02F 1/11* (2006.01)
*H01S 3/106* (2006.01)

(52) U.S. Cl.
CPC ............ *G02F 1/332* (2013.01); *G02F 1/11* (2013.01); *H01S 3/1068* (2013.01); *G02F 2201/16* (2013.01)

(58) Field of Classification Search
CPC ... G02F 1/11; G02F 1/33; G02F 1/332; G02F 1/335; G02F 1/3134; G02F 2201/16;
(Continued)

(56) References Cited

U.S. PATENT DOCUMENTS 3,671,103 A * 6/1972 Uchida et al. ............ G02F 1/33
359/305
3,828,276 A * 8/1974 Cohen ...................... G02F 1/11
372/13
(Continued)

FOREIGN PATENT DOCUMENTS

CN        1967316 A    5/2007
CN      101738815 A    6/2010
(Continued)

OTHER PUBLICATIONS

Kirkby et al, "A compact acousto-optic lens for 2D and 3D femtosecond based 2-photon microscopy", Optics Express, vol. 18, No. 13, Jun. 7, 2010, p. 13721-13745.*
(Continued)

*Primary Examiner* — Jie Lei
(74) *Attorney, Agent, or Firm* — Kurt M Eaton

(57) ABSTRACT

A beam positioner includes a first acousto-optic (AO) deflector (AOD) comprising an AO cell and a transducer attached to the AO cell, and a wave plate optically contacted to the first AOD.

15 Claims, 2 Drawing Sheets

(58) Field of Classification Search
CPC .... G02F 2203/24; H01S 3/106; H01S 3/1068; H01S 3/117; G02B 21/00; G02B 21/002; G02B 21/0036; G02B 21/0092; G02B 21/0076; G02B 27/09
USPC ................ 359/285–287, 238, 245, 278, 305, 359/310–312, 314, 321; 372/9, 10, 13, 372/21

See application file for complete search history.

(56) References Cited

U.S. PATENT DOCUMENTS

| | | | |
|---|---|---|---|
| 4,723,448 A * | 2/1988 | Veligdan | G01N 29/2418 73/657 |
| 5,205,967 A | 4/1993 | Macken | |
| 7,965,437 B2 | 6/2011 | Lovering et al. | |
| 9,341,919 B2 | 5/2016 | Kirkby et al. | |
| 2005/0226557 A1 | 10/2005 | Trutna et al. | |
| 2009/0290209 A1 | 11/2009 | Kubo | |
| 2012/0044569 A1 | 2/2012 | Maak et al. | |
| 2013/0057946 A1 | 3/2013 | Kirkby et al. | |
| 2014/0016186 A1 | 1/2014 | Fujikawa et al. | |
| 2014/0029081 A1 | 1/2014 | Kirkby et al. | |
| 2015/0029578 A1 | 1/2015 | Rozsa et al. | |
| 2016/0274439 A1 | 9/2016 | Bianchini et al. | |
| 2017/0336697 A1 * | 11/2017 | Peled | G02F 1/33 |

FOREIGN PATENT DOCUMENTS

| | | |
|---|---|---|
| DE | 102013201968 A4 | 8/2014 |
| WO | WO01/16556 A1 | 3/2001 |

OTHER PUBLICATIONS

The PCT/US2018/038195, international search report dated Oct. 16, 2018, 2 pages.
The PCT/US2018/038195, written opinion, 2 pages.
Hirohito Nishi, et al., Transparent Waveplate (Retarder) of ZnSe for High Power CO2 Laser.
The European search report issued to the U.S. Appl. No. 18/828,356 dated Feb. 1, 2021, 7 pages.
Taiwanese office action issued to the application No. 107121329 dated Dec. 20, 2021, 4 pages.

* cited by examiner

OPTICALLY CONTACTED ACOUSTO-OPTIC DEVICE AND METHOD OF MAKING THE SAME

CROSS-REFERENCE TO RELATED APPLICATIONS

This application is a PCT National Phase in US. Which claims the benefit of U.S. Provisional Application No. 62/528,278, filed Jul. 3, 2017, which is incorporated by reference in its entirety.

BACKGROUND

I. Technical Field

Embodiments described herein relate generally to an acousto-optic device, and more particularly, to an acousto-optic device that is optically contacted with another optical component.

II. Technical Background

Acousto-optic (AO) devices, sometimes referred to as Bragg cells, diffract and shift light using acoustic waves at radio frequency. These devices are often used for Q-switching, signal modulation in telecommunications systems, laser scanning and beam intensity control in microscopy systems, frequency shifting, wavelength filtering in spectroscopy systems. Many other applications lend themselves to using acousto-optic devices. For example, AO deflectors (AODs) can be used in laser-based materials processing systems.

In a typical AO device, a transducer, such as a piezoelectric transducer, is attached to an AO medium (also referred to as an "AO cell"), typically a crystal or glass that is suitably transparent to the wavelength of light to be diffracted. An RF signal (also known as a "drive signal") is applied to the transducer (e.g., from an RF driver), thereby driving the transducer to vibrate at a certain frequency to create an acoustic wave that propagates in the AO medium. The propagating acoustic wave creates periodic regions of expansion and compression in the AO medium, thereby creating a periodically changing refractive index within the AO medium. The periodically changing refractive index functions like an optical grating that can diffract a beam of laser light propagating through the AO medium.

Within the field of laser-based materials processing, AODs are advantageously used to deflect a beam of laser light onto a workpiece because they are faster than tiltable mirrors (e.g., galvanometer-based mirror systems) and other mechanisms often similarly used. Referring to FIG. 1, an AOD 100 generally includes AO medium 102, a transducer 104 attached to the AO medium 102 (i.e., at a transducer end of the AO medium 102), an acoustic absorber 106 attached to the AO medium 102 (i.e., at an absorber end of the AO medium 102, opposite the transducer end), an RF driver 108 electrically coupled to an input of the transducer 104. The material from which the AO medium 102 is formed is selected depending on the wavelength of light in the beam of laser light to be deflected. The transducer 104 is generally a piezoelectric transducer, and is operative to vibrate in response to an input RF signal (i.e., drive signal) output by the RF driver 108. The driver 108 is operative to generate the drive signal that is ultimately input to the transducer 104.

Generally, the transducer 104 is attached to the AO medium 102 such that vibrations generated by the transducer 104 can create a corresponding acoustic wave (e.g., as indicated by lines 112) that propagates within the AO medium 102, from the transducer end toward the acoustic absorber 106 (e.g., as indicated by arrow 110, which represents the propagation direction of the acoustic wave 112 within the AO medium 102). As exemplarily illustrated in FIG. 1, when a drive signal (e.g., composed of a drive frequency, f) is applied to the transducer 104, the transducer 104 vibrates to create an acoustic wave propagating within the AO medium 102, thereby generating a periodically changing refractive index within the AO medium 102. The periodically changing refractive index functions to diffract a beam of laser light (e.g., incident upon a first surface 102a of the AO medium 102 along axis 114, and propagating through the AO medium 102), and thereby deflect the beam of laser light transmitted through the AO medium 102 so that the diffracted beam exits the AO medium 102 (e.g., along axis 116), through a second surface 102b of the AO medium 102 opposite the first surface 102a. The angle of deflection, angle θ, of the first process beam corresponds to the drive frequency, f, used to deflect the incident beam of laser light. When no drive signal is applied to the transducer 104, the incident beam of laser light is transmitted through the AO medium 102 without being deflected (e.g., along axis 114).

From the discussion above, it should be recognized that the direction along which an incident beam of laser light is be deflected, corresponds to an axis (also referred to herein as a "deflection axis") along which the aforementioned propagation direction 110 extends. Thus, a laser beam can be deflected along multiple axes by providing a system that includes multiple AODs that are oriented along different deflection axes. For example, and with reference to FIG. 2, a beam of laser light can be deflected by a first AOD 200 (e.g., along an X-axis) and, subsequently, deflected by a second AOD 202 (e.g., along a Y-axis, orthogonal to the X-axis). In this example, the deflection axis 204 of the first AOD 200 is aligned with the X-axis and the deflection axis 206 of the second AOD 202 is aligned with the Y-axis. Thus, the deflection generated by the second AOD 202 can be superimposed on the deflection generated by the first AOD 200. Of course, it is possible to transmit the beam of laser light through one or both of the first and second AODs 200 and 202 without deflecting the beam of laser light. In view of the above, the first and second AODs 200 and 202 can be, collectively, characterized as a multi-axis "beam positioner" and selectively operated to deflect a beam of laser light (e.g., initially propagating along axis 114) within a two-dimensional range 208 (also known as a "scan field," "scanning range," etc.). Like the AOD 100, each of the first AOD 200 and the second AOD 202 can be generally characterized as including an AO cell 201 and a transducer 203 attached to the AO cell 201 (e.g., at a transducer end of the AO cell 201). Although not illustrated, the transducer 203 of each of the first AOD 200 and the second AOD 202 can be electrically connected to one or more drivers (e.g., one or more drivers such as driver 108).

Depending on the type of AODs included in the beam positioner, it can be desirable to include a half-wave plate between the first and second AODs 200 and 202. The half-wave plate will be desired if, for such AODs, the amount of RF drive power required to deflect a significant portion of the beam of laser light into the desired direction is highly dependent on the polarization state of the beam of laser light being deflected. If such a pair of AODs is made from two similar AODs (similar in that the AO medium 102 of the AODs is formed of the same material and they use the same type of acoustic wave to deflect the beam of laser light), and if it is desirable to have the polarization state of the beam in the first AOD be linear and oriented in a particular direction relative to the plane of deflection, then it would be similarly desirable to have the polarization state in the second AOD be rotated with respect to the polarization state of the beam in the first AOD just as the second AOD is rotated with respect to the first AOD. The half-wave plate is the optical component that allows for such a rotation of the polarization. The orientation of polarization after the half-wave plate relative to the incoming beam is a function of the orientation of the half-wave plate relative to the polarization orientation of the incoming beam.

Conventional multi-axis beam positioners, such as those described above with respect to FIG. 2, suffer from many drawbacks. First, the various components of the multi-axis beam positioner (e.g., the first AOD 200, the second AOD 202, the half-wave plate, etc.) must be spatially aligned relative to one another using multiple mounts and one or more frames, etc., which can be expensive and be difficult to place and maintain in proper alignment. Second, the surfaces of the various components of the multi-axis beam positioner (e.g., the first AOD 200, the second AOD 202, the half-wave plate, etc.) are typically coated (e.g., with an anti-reflective coating) which contributes to a not insignificant amount to the cost of the multi-axis beam positioner. Third, the surfaces of the various components of the multi-axis beam positioner (e.g., the first AOD 200, the second AOD 202, the half-wave plate, etc.), even when coated with anti-reflection coatings, contribute to various optical losses (e.g., due to reflection, scattering, etc.) of up to 1% (or thereabout), which can degrade the optical efficiency of the multi-axis beam positioner (e.g., by reducing the ratio between the intensity of the beam of laser light incident upon the multi-axis beam positioner (e.g., initially propagating along axis 114) and the intensity of the beam of laser light ultimately transmitted into the scan field 208. Fourth, the surfaces of the various components of the multi-axis beam positioner (e.g., the first AOD 200, the second AOD 202, the half-wave plate, etc.) yield a relatively large surface area that can become contaminated. Fifth, the distance between pivot points of the first and second AODs 200 and 202 can be undesirably large (e.g., depending upon the material from which the AO cell 102 of each AOD is formed). Also, the mounts used to position and orient the first and second AODs 200 and 202 and the half-wave plate take up space that could otherwise allow the first and second AODs 200 and 202 to be placed closer together (thus making it difficult to reduce the distance between the pivot points of the first and second AODs 200 and 202).

SUMMARY

One embodiment of the present invention can be broadly characterized as a beam positioner that includes a first acousto-optic (AO) deflector (AOD) comprising an AO cell and a transducer attached to the AO cell, and a wave plate optically contacted to the first AOD.

DETAILED DESCRIPTION

Figure 1:
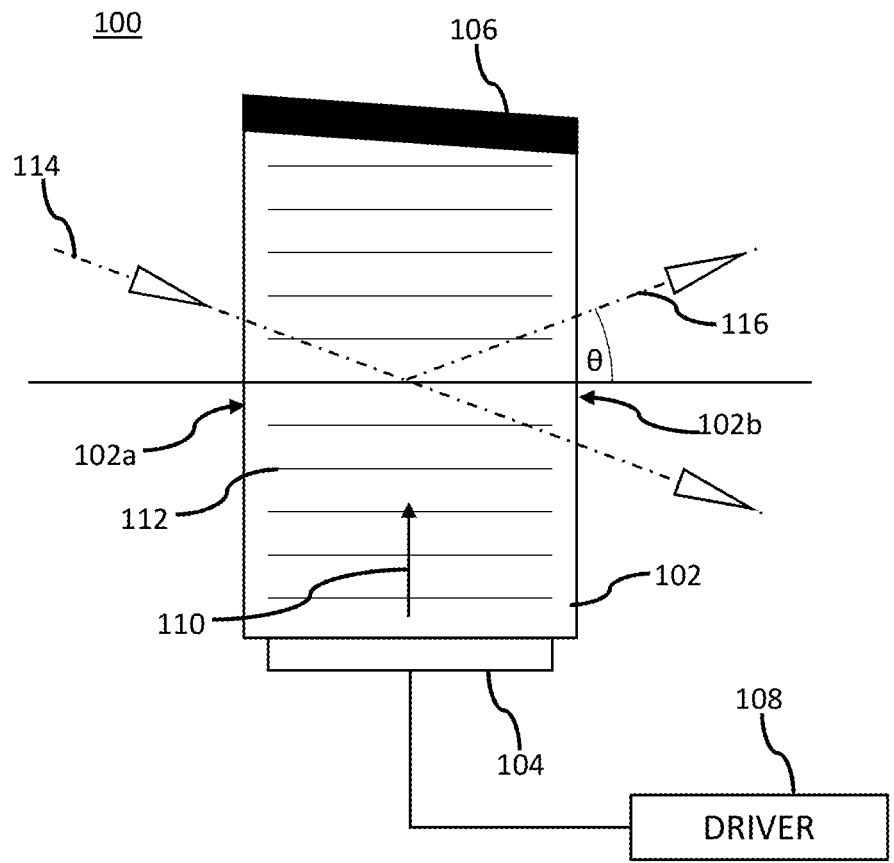
FIG. 1 schematically illustrates an AOD, and its general principle of operation.
Figure 2:
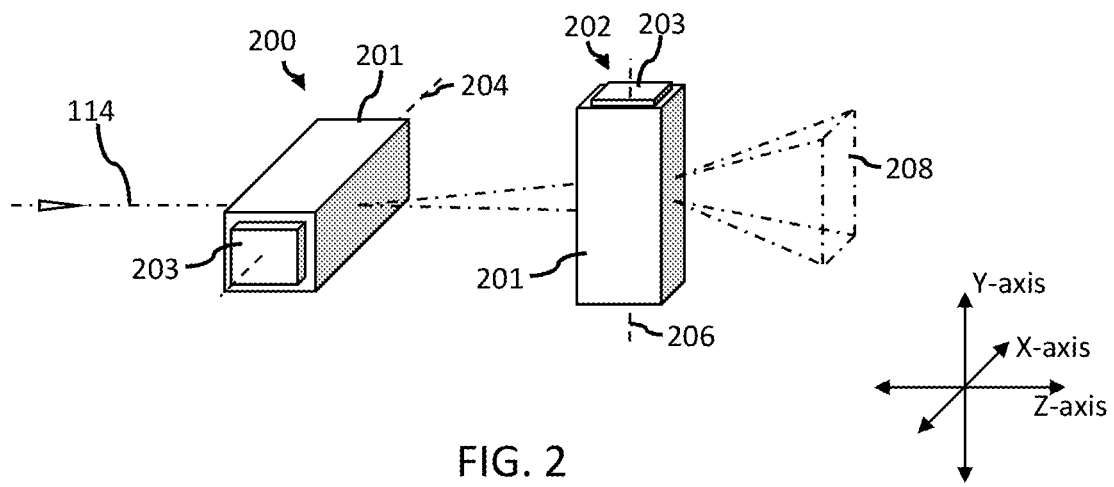
FIG. 2 schematically illustrates how a pair of sequentially-arranged AODs can be operated to effect two-dimensional scanning of a laser beam.

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," "approximately," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

Figure 3:
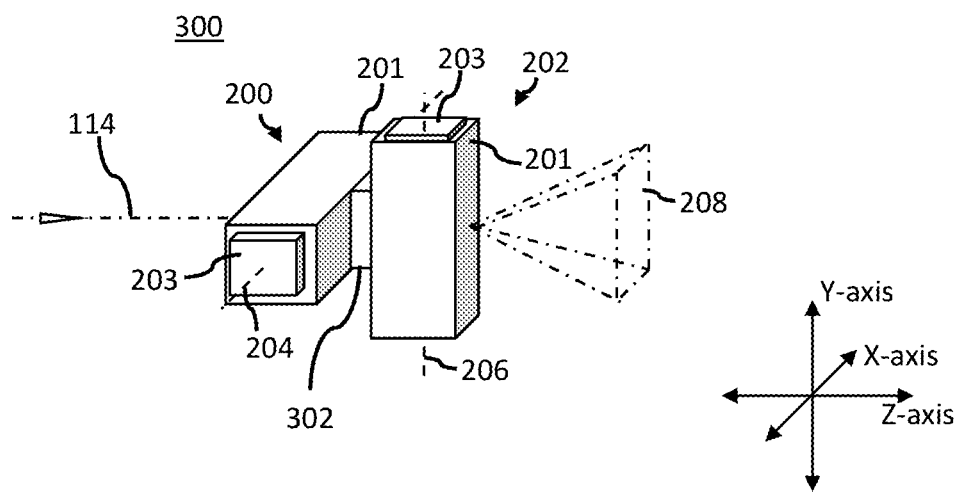
FIG. 3 is a perspective view schematically illustrating an optically contacted AOD, according to one embodiment.

Embodiments of the present invention can be generally characterized as providing a multi-axis beam positioner including optically-contacted components. In such embodiments, two or more components of the multi-axis beam positioner may be optically-contacted together. For example, as shown in FIG. 3, a multi-axis beam positioner 300 may include the aforementioned first AOD 200, the second AOD 202 and a half-wave plate 302 interposed between the first and second AODs 200 and 202, but the first AOD 200 is optically-contacted to the half-wave plate 302

(e.g., at a first side of the half-wave plate 302) and the second AOD 202 is optically-contacted to the half-wave plate 302 (e.g., at a second side of the half-wave plate 302, opposite the first side). In another embodiment, the first AOD 200 is optically-contacted to the half-wave plate 302 (e.g., at the first side of the half-wave plate 302) and the second AOD 202 is not optically-contacted to the half-wave plate 302. In another embodiment, the second AOD 202 is optically-contacted to the half-wave plate 302 (e.g., at the second side of the half-wave plate 302) and the first AOD 200 is not optically-contacted to the half-wave plate 302. In any such embodiment, the orientation of the axes of the two AODs may be at some angle (e.g., 90 degrees) and the orientation of the half-wave plate may be chosen such that an input beam with a desirable polarization state in the first AOD 200 has its polarization state changed by the half-wave plate to subsequently be desirable in the second AOD 202.

The material from which the AO medium 102 of the first and second AODs 200 and 202 is formed can be a material such as Ge, $PbMoO_4$, $TeO_2$, crystalline quartz, glassy $SiO_2$, $As_2S_3$, or the like, and as is known in the art, is typically selected depending on the wavelength of light in the beam of laser light to be deflected. The material from which the half-wave plate 302 is formed can include a material such as crystalline quartz, sapphire, calcite, mica, silicon, germanium, barium fluoride, lithium fluoride, calcium fluoride, zinc selenide, magnesium fluoride, or the like, and as is known in the art, is typically selected depending on the wavelength of light in the beam of laser light to be deflected. It should be noted that, if the half-wave plate 302 is formed of an normally optically-isotropic material (e.g., zinc selenide, etc.), it should be recognized that such material can be processed to exhibit birefringence by applying an external stress at a normal operating temperature of the multi-axis beam positioner, by "freezing in" stress-induced birefringence obtained after deforming the material at an elevated temperature (e.g., as discussed in U.S. Pat. No. 5,205,967, incorporated herein by reference), or the like or any combination thereof.

Components of the multi-axis beam positioner 300 may be optically-contacted (e.g., in the manner discussed above) by any suitable process. For example, the surface of one or both of the first and second AODs 200 and 202 may be optically-contacted to a corresponding surface of the half-wave plate 302 by performing a frit bonding process, a diffusion bonding process, by simply polishing, cleaning and physically contacting the surfaces of any two components to be optically contacted, or any combination thereof. As an alternative to, or in addition to, the aforementioned techniques, other optical contacting techniques may be employed, such as: solution-assisted direct bonding, chemically-activated direct bonding, or the like or any combination thereof. In another example, components of the multi-axis beam positioner 300 may be optically-contacted (e.g., in the manner discussed above) by clamping the two or more of the components together. In this case, the clamping may be performed by any suitable technique to ensure that the surfaces to be optically-contacted are spaced apart by a distance that is less than the wavelength of light in the beam of laser light to be deflected. For example, the distance may be less than a tenth of the wavelength of light in the beam of laser light, less than a quarter of the wavelength of light in the beam of laser light, less than half of the wavelength of light in the beam of laser light, less than three-quarters of the wavelength of light in the beam of laser light, less than the wavelength of light in the beam of laser light, etc., or between any of these values.

In one embodiment, the AO cells of the first and second AODs 200 and 202 are formed of the same material as the half-wave plate 302. For example, the AO cells of the first and second AODs 200 and 202 and the half-wave plate 302 may be formed of crystalline quartz. In another example, the AO cells of the first and second AODs 200 and 202 and the half-wave plate 302 may be formed of $TeO_2$. In this embodiment, any surface of a component (e.g., the first or second AOD 200 or 202) that is optically-contacted with the surface of another component (e.g., the half-wave plate 302) does not need to be coated with a coating such as an antireflective coating. In another embodiment, however, one or more such coatings may be coated onto one or both optically-contacted surfaces. By omitting the provision of coatings between optically-contacted surfaces, the cost of the multi-axis beam positioner 300 can be reduced (e.g., relative to the cost of conventional multi-axis beam positioners discussed above).

In another embodiment, the AO cells of the first and second AODs 200 and 202 are formed of a material that is different from that from which the half-wave plate 302 is formed. For example, the AO cells of the first and second AODs 200 and 202 may be formed of germanium (Ge) and the half-wave plate 302 may be formed of a material such as zinc selenide. In this example, the zinc selenide can be preprocessed to "freeze in" stress-induced birefringence obtained after deforming the material at an elevated temperature (e.g., as discussed above). In another example, a zinc selenide half-wave plate 302 may be provided as Fresnel ZnSe half-wave plate, e.g., as provided by WAVELENGTH OPTO-ELECTRONIC PTE LTD. In another example, a zinc selenide half-wave plate 302 may be provided as an assembly of a pair of prism-shaped ZnSe substrates and optimized optical coating films (including anti-reflecting and phase-shifting films) as described in NISHI, Hirohito, et al., "Transparent Waveplate (Retarder) of ZnSe for High Power $CO_2$ Lasers," SEI TECHNICAL REVIEW 81 (2015): 73, which is incorporated herein by reference.

In embodiments in which the AO cells of the first and second AODs 200 and 202 are formed of a material that is different from that from which the half-wave plate 302 is formed, any surface of a component (e.g., the first or second AOD 200 or 202) that is optically-contacted with the surface of another component (e.g., the half-wave plate 302) can be coated with a coating such as an anti-reflective coating.

In the embodiments discussed above, a half-wave plate 302 (when provided) is interposed between the first and second AODs 200 and 202. However in another embodiment, the half-wave plate 302 may be replaced with two quarter-wave plates that are optically contacted to each other.

In the embodiments discussed above, the beam positioner 300 is provided as a multi-axis beam positioner with two AODs (i.e., the first and second AODs 200 and 202). In other embodiments, the beam positioner may include a single AOD, or more than two AODs. In an embodiment in which the beam positioner includes a single AOD, the beam positioner may include the half-wave plate 302, or at least one quarter-wave plate (e.g., a single quarter-wave plate, two-quarter wave plates, three quarter-wave plates, etc.), or the like or any combination thereof, optically-contacted to the second surface 102b of the AO medium 102 of the AOD. In an embodiment in which the beam positioner includes a more than two AODs, the beam positioner may or may not include a half-wave plate (such as half-wave plate 302) interposed between a pair of adjacent AODs (e.g., as discussed above).

In the embodiments discussed above, the beam positioner is described as including, as beam deflecting devices, one or more AODs. It should be recognized that the beam positioner may include one or more other beam deflecting devices (e.g., arranged so as to deflect any beam of light transmitted by any of the AODs described above). In such a case, any of such other beam deflecting devices may include an electro-optic deflector (EOD), a fast-steering mirror (FSM) element actuated by a piezoelectric actuator, electrostrictive actuator, voice-coil actuator, etc., a galvanometer mirror, a rotating polygon mirror scanner, etc., or the like or any combination thereof.

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A beam positioner, comprising:
    a first acousto-optic (AO) deflector (AOD) operative to deflect a beam of laser light, wherein the first AOD comprises a first AO cell and a first transducer attached to the first AO cell;
    second AOD operative to deflect the beam of laser light, wherein the second AOD comprises a second AO cell and a second transducer attached to the second AO cell; and
    a wave plate between the first AOD and the second AOD, wherein the wave plate is optically contacted to the first AOD and to the second AOD such that optically contacted surfaces of the wave plate and the first AOD are spaced apart by a distance that is less than a wavelength of the beam of laser light and such that optically contacted surfaces of the wave plate and the second AOD are spaced apart by a distance that is less than the wavelength of the beam of laser light.

2. The beam positioner of claim 1, wherein the wave plate is a half-wave plate.

3. The beam positioner of claim 1, wherein the wave plate includes at least one quarter-wave plate.

4. The beam positioner of claim 3, wherein the at least one quarter-wave plate includes two quarter-wave plates.

5. The beam positioner of claim 1, wherein the first AOD is arranged and configured to deflect the beam of laser light along a first axis and wherein the second AOD is arranged and configured to deflect the beam of laser light transmitted by the first AOD along a second axis different from the first axis.

6. The beam positioner of claim 1, further comprising:
    at least one galvanometer mirror configured to deflect the beam of laser light sequentially transmitted by the first AOD, the wave plate and the second AOD.

7. The beam positioner of claim 1, wherein the AO cell of the first AOD is formed of the same material as the wave plate.

8. The beam positioner of claim 1, wherein the AO cell of the first AOD and the wave plate are formed from different materials.

9. The beam positioner of claim 1, wherein the AO cell of the first AOD is formed of germanium.

10. The beam positioner of claim 1, wherein the AO cell of the first AOD is formed of tellurium dioxide.

11. The beam positioner of claim 1, wherein the AO cell of the first AOD is formed of crystalline quartz.

12. The beam positioner of claim 1, wherein the wave plate is formed of crystalline quartz.

13. The beam positioner of claim 1, wherein the wave plate includes a material formed of zinc selenide.

14. The beam positioner of claim 1, wherein the AO cell of the second AOD is formed of the same material as the AO cell of the first AOD.

15. The beam positioner of claim 1, wherein the no anti-reflective coating is present between the first AOD and the wave plate.

* * * * *